(12) United States Patent
Li et al.

(10) Patent No.: US 12,379,212 B1
(45) Date of Patent: Aug. 5, 2025

(54) METHOD AND DEVICE FOR CONTROLLING ENGINEERING PROJECTION DEFORMATION

(71) Applicants: Powerchina Northwest Engineering Corporation Limited, Xi'an (CN); Lanzhou Jiaotong University, Lanzhou (CN)

(72) Inventors: Zufeng Li, Xi'an (CN); Haowen Yan, Lanzhou (CN); Wenjun Zhao, Xi'an (CN); Shuwen Yang, Lanzhou (CN); Xiaoning Su, Lanzhou (CN); Haixing Shang, Xi'an (CN); Shengjie Di, Xi'an (CN); Zhixuan Miao, Xi'an (CN); Zhao Zhang, Xi'an (CN); Mingbo Liu, Xi'an (CN)

(73) Assignees: Powerchina Northwest Engineering Corporation Limited, Xi'an (CN); Lanzhou Jiaotong University, Lanzhou (CN)

( * ) Notice: Subject to any disclaimer, the term of this patent is extended or adjusted under 35 U.S.C. 154(b) by 0 days.

(21) Appl. No.: 19/035,827

(22) Filed: Jan. 24, 2025

(30) Foreign Application Priority Data

Jul. 12, 2024 (CN) .......................... 202410933087.1

(51) Int. Cl.
*G01C 5/00* (2006.01)
*G01C 15/02* (2006.01)
(52) U.S. Cl.
CPC .............. *G01C 5/00* (2013.01); *G01C 15/02* (2013.01)
(58) Field of Classification Search
CPC .................................. G01C 5/00; G01C 15/02
See application file for complete search history.

(56) References Cited

U.S. PATENT DOCUMENTS

| 8,525,724 B2 * | 9/2013 | Insanic ................. G01S 13/951 342/26 D |
| 9,581,725 B2 * | 2/2017 | Davis ..................... G01V 20/00 |
| 2014/0207380 A1 * | 7/2014 | Davis ..................... G01S 13/88 702/2 |

FOREIGN PATENT DOCUMENTS

| CN | 104077476 B | * | 4/2017 | |
| CN | 107167119 A | * | 9/2017 | ............. G01C 15/00 |

(Continued)

OTHER PUBLICATIONS

CNIPA, Notification of First Office Action for CN202410933087.1, Aug. 26, 2024.

(Continued)

*Primary Examiner* — Yaritza Guadalupe-McCall
(74) *Attorney, Agent, or Firm* — Hemisphere Law, PLLC; Zhigang Ma

(57) ABSTRACT

A method for controlling engineering projection deformation includes: calculating, based on known coordinates of an engineering key region, a change rate of a length deformation function per kilometer in a first direction caused by a height difference of the engineering key region and a change rate of the length deformation function per kilometer in the first direction caused by a distance from a central meridian of a Gaussian projection zone of the engineering key region; solving a distance between a meridian where a center of the engineering key region is located and a new central meridian; solving an elevation of a compensation projection plane; and performing comprehensive projection deformation compensation based on the elevation of the compensation projection plane and the distance between the meridian where the center of the engineering key region is located and the new central meridian, so as to realize the controlling of engineering projection deformation.

7 Claims, 3 Drawing Sheets

(56) References Cited

FOREIGN PATENT DOCUMENTS

| CN | 105869127 B | * | 10/2018 | ............... | G06T 5/80 |
| CN | 105931199 B | * | 1/2019 | ............... | G06T 5/80 |
| CN | 118392127 A | * | 7/2024 | ............... | G01C 5/00 |
| CN | 118500368 A | * | 8/2024 | ............... | E02D 1/02 |
| CN | 119665910 B | * | 5/2025 | | |

OTHER PUBLICATIONS

China Power Construction Northwest Survey and Design Institute Co., Ltd (Applicant), Replacement claims (allowed) of CN202410933087.1, Sep. 11, 2024.

CNIPA, Notification to grant patent right for invention in CN202410933087.1, Sep. 20, 2024.

* cited by examiner

```
┌─────────────────────────────────────────────────────────────────────┐
│ calculating, based on known coordinates of an engineering key       │
│ region, a change rate of a length deformation function per          │──── S101
│ kilometer in a first direction caused by a height difference of     │
│ the engineering key region and a change rate of the length          │
│ deformation function per kilometer in the first direction caused    │
│ by a distance from a central meridian of a Gaussian projection      │
│ zone of the engineering key region                                  │
└─────────────────────────────────────────────────────────────────────┘
                                   │
┌─────────────────────────────────────────────────────────────────────┐
│ solving a distance between a meridian where a center of the         │
│ engineering key region is located and a new central meridian        │──── S102
│ based on the change rate of the length deformation function per     │
│ kilometer in the first direction caused by the height difference    │
│ and the change rate of the length deformation function per          │
│ kilometer in the first direction caused by the distance from        │
│ the central meridian of the Gaussian projection zone of the         │
│ engineering key region                                              │
└─────────────────────────────────────────────────────────────────────┘
                                   │
┌─────────────────────────────────────────────────────────────────────┐
│ solving an elevation of a compensation projection plane based on    │──── S103
│ the distance between the meridian where the engineering key         │
│ region is located and the new central meridian                      │
└─────────────────────────────────────────────────────────────────────┘
                                   │
┌─────────────────────────────────────────────────────────────────────┐
│ performing comprehensive projection deformation compensation        │──── S104
│ based on the elevation of the compensation projection plane and     │
│ the distance between the meridian where the center of the           │
│ engineering key region is located and the new central meridian,     │
│ so as to realize the controlling of engineering projection          │
│ deformation                                                         │
└─────────────────────────────────────────────────────────────────────┘
```

FIG. 1

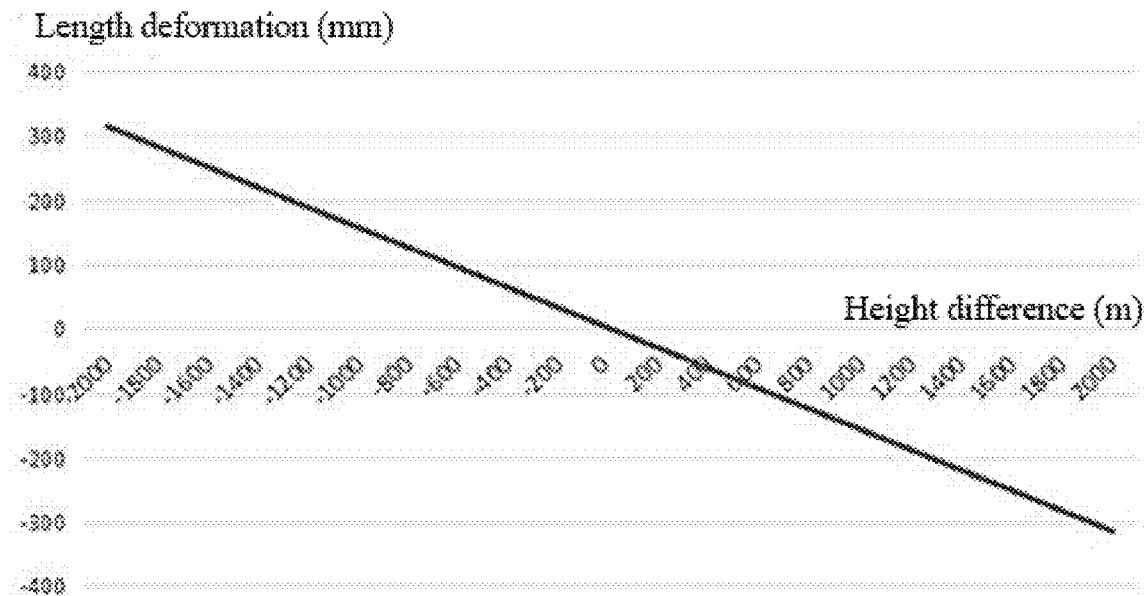

FIG. 2

METHOD AND DEVICE FOR CONTROLLING ENGINEERING PROJECTION DEFORMATION

CROSS-REFERENCE TO RELATED APPLICATION

This application claims priority to Chinese patent application No. CN 202410933087.1, filed to China National Intellectual Property Administration (CNIPA) on Jul. 12, 2024, which is herein incorporated by reference in its entirety.

TECHNICAL FIELD

The disclosure relates to the field of engineering measurement technologies, and more particularly to a method and a device for controlling engineering projection deformation.

BACKGROUND

As a key index to measure the technical strength of an organization, the level of precision engineering measurement (also referred to as precision engineering measurement) is directly related to the success of an engineering project. In this field, the projection deformation control of measurement results is a complex problem that has long troubled the field of precision engineering measurement. It not only affects the accuracy of measurement data, but also poses a great challenge to the construction progress and quality of large or even super-large engineering projects.

According to the national and industrial standards, the deformation error caused by map projection in engineering measurement must be controlled within a very small range and must not exceed the precision threshold set in each construction stage. However, the reality is often more complicated. Different landforms and the distribution characteristics of the project itself make the projection deformation become a factor that cannot be ignored in the actual measurement operation, especially in the areas with obvious topographic height difference, such as mountainous areas or large-scale bridges, hydropower projects, pumped storage power station projects, tunnels and other ultra-large height difference projects. The traditional projection deformation control methods are difficult to effectively deal with under the same reduction benchmark, and the consistency and accuracy of regional measurement data cannot be guaranteed.

Therefore, the development of a new technical method that can effectively suppress the projection deformation of precision engineering measurement with large height difference under the same reduction benchmark has become a technical bottleneck that needs to be broken through urgently in the field of engineering measurement.

SUMMARY

In order to overcome the problems existing in related art, the disclosure provides a method and a device for controlling engineering projection deformation.

According to a first aspect of an embodiment of the disclosure, there is provided an engineering projection deformation control method, including:

calculating, based on known coordinates of an engineering key region, a change rate of a length deformation function per kilometer in a first direction caused by a height difference of the engineering key region and a change rate of the length deformation function per kilometer in the first direction caused by a distance from a central meridian of a Gaussian projection zone of the engineering key region;

solving a distance between a meridian where a center of the engineering key region is located and a new central meridian based on the change rate of the length deformation function per kilometer in the first direction caused by the height difference and the change rate of the length deformation function per kilometer in the first direction caused by the distance from the central meridian of the Gaussian projection zone of the engineering key region;

solving an elevation of a compensation projection plane based on the distance between the meridian where the engineering key region is located and the new central meridian; and performing comprehensive projection deformation compensation based on the elevation of the compensation projection plane and the distance between the meridian where the center of the engineering key region is located and the new central meridian, so as to realize the controlling of engineering projection deformation.

In some embodiments of the disclosure, the calculating, based on known coordinates of an engineering key region, a change rate of a length deformation function per kilometer in a first direction caused by a height difference of the engineering key region includes:

based on the known coordinates of the engineering key region, calculating an elevation difference between an elevation plane where a side length is located and a reduction projection plane of the side length;

based on the elevation difference between the elevation plane where the side length is located and the reduction projection plane of the side length, calculating a deformation per kilometer of known points of the engineering key region caused by the height difference; and based on the deformation per kilometer of the known points of the engineering key region caused by the height difference, calculating the change rate of the length deformation function per kilometer in the first direction caused by the height difference of the engineering key region.

In some embodiments of the disclosure, the based on the elevation difference between the elevation plane where the side length is located and the reduction projection plane of the side length, calculating a deformation per kilometer of known points of the engineering key region caused by the height difference includes:

$$\Delta D = -\frac{\Delta H_m}{R_m}.$$

In the formula, $\Delta D$ is the deformation of length caused by the height difference; $\Delta H_m$ is the elevation difference between the elevation plane where the side length is located and the reduction projection plane of the side length; and $R_m$ is an average radius of curvature of the earth.

In some embodiments of the disclosure, the based on the deformation per kilometer of the known points of the engineering key region caused by the height difference, calculating the change rate of the length deformation function per kilometer in the first direction caused by the height difference of the engineering key region includes:

$$k_D = \frac{\Delta D_2 - \Delta D_1}{\overline{S}}.$$

In the formula, $k_D$ is the change rate of the length deformation function per kilometer in the first direction caused by the height difference of the engineering key region; $\Delta D_1$ and $\Delta D_2$ are the length deformations per kilometer caused by the height difference at two ends of the engineering key region in the first direction respectively; $\overline{S}=|Y_1-Y_2|$ is a distance between two endpoints of the engineering key region in the first direction, and $Y_1$ and $Y_2$ are a first end abscissa and a second end abscissa of the engineering key region in the first direction respectively.

In some embodiments of the disclosure, the calculating, based on known coordinates of an engineering key region, a change rate of the length deformation function per kilometer in the first direction caused by a distance from a central meridian of a Gaussian projection zone of the engineering key region includes:
  based on the known coordinates of the engineering key region, calculating a length deformation caused by a distance of a measurement edge from the central meridian of the Gaussian projection zone of the engineering key region;
  based on the length deformation caused by the distance of the measurement edge from the central meridian of the Gaussian projection zone, calculating a deformation per kilometer of the known points caused by the distance from the central meridian of the Gaussian projection zone of the engineering key region; and
  based on the deformation per kilometer of the known points caused by the distance from the central meridian of the Gaussian projection zone of the engineering key region, calculating the change rate of the length deformation function per kilometer in the first direction caused by the distance from the central meridian of the Gaussian projection zone of the engineering key region.

In some embodiments of the disclosure, the solving a distance between a meridian where a center of the engineering key region is located and a new central meridian based on the change rate of the deformation function per kilometer length in the first direction caused by the height difference and the change rate of the deformation function per kilometer length in the first direction caused by the distance from the central meridian of the Gaussian projection zone of the engineering key region includes:
  controlling the change rate of the length deformation function per kilometer in the first direction caused by the height difference of the engineering key region to be equal to the change rate of the length deformation function per kilometer in the first direction caused by the distance from the central meridian of the Gaussian projection zone of the engineering key region, to obtain a distance function between the meridian where the center of the engineering key region is located and the new central meridian; and
  based on the change rate of the length deformation function per kilometer in the first direction caused by the height difference of the engineering key region, calculating the distance between the meridian where the center of the engineering key region is located and the new central meridian by using the distance function between the meridian where the center of the engineering key region is located and the new central meridian.

In some embodiments of the disclosure, the distance function between the meridian where the center of the engineering key region is located and the new central meridian is:

$$Y'_m = R_m^2 k_D.$$

In the formula, $Y'_m$ is the distance between the meridian where the center of the engineering key region is located and the new central meridian, and $k_D$ is the change rate of the length deformation function per kilometer in the first direction caused by the height difference of the engineering key region.

In some embodiments of the disclosure, the performing comprehensive projection deformation compensation based on the elevation of the compensation projection plane and the distance between the meridian where the center of the engineering key region is located and the new central meridian, so as to realize the controlling of engineering projection deformation includes:
  correcting the elevation of the compensation projection plane to obtain a corrected elevation of the compensation projection plane; and
  based on the elevation of the compensation projection plane or the corrected elevation of the compensation projection plane, performing the comprehensive projection deformation compensation using the distance between the meridian where the center of the engineering key region is located and the new central meridian and the elevation of the compensation projection plane, so as to realize the controlling of engineering projection deformation.

In some embodiments of the disclosure, the correcting the elevation of the compensation projection plane to obtain a corrected elevation of the compensation projection plane includes:
  based on the known coordinates of the engineering key region, a precise measured horizontal distance and a calculated side length from control points of a global navigation satellite system, calculating a side length reduction scale ratio of the global navigation satellite system relative to a measured ground control network;
  calculating a residual error of the side length reduction scale ratio by using the side length reduction scale ratio;
  calculating a scale ratio residual error correction value of the compensation projection plane by using the residual error of the side length reduction scale ratio and a length deformation calculation formula caused by the height difference; and
  acquiring the corrected elevation of the compensation projection plane based on the scale ratio residual error correction value of the compensation projection plane and the elevation of the compensation projection plane.

According to a second aspect of an embodiment of the disclosure, there is provided a device for controlling engineering projection deformation, including: a change rate determine module, a distance determination module, a compensation projection plane elevation determination module, and a comprehensive projection deformation compensation module.

The change rate determination module is configured (i.e., arranged and structured) to calculate, based on known coordinates of an engineering key region, a change rate of a length deformation function per kilometer in a first direction caused by a height difference of the engineering key region and a change rate of the length deformation function per kilometer in the first direction caused by a distance from a central meridian of a Gaussian projection zone of the engineering key region.

The distance determination module is configured to solve a distance between a meridian where a center of the engineering key region is located and a new central meridian based on the change rate of the length deformation function per kilometer in the first direction caused by the height difference and the change rate of the length deformation function per kilometer in the first direction caused by the distance from the central meridian of the Gaussian projection zone of the engineering key region.

The compensation projection plane elevation determination module is configured to solve an elevation of a compensation projection plane based on the distance between the meridian where the engineering key region is located and the new central meridian.

The comprehensive projection deformation compensation module is configured to perform comprehensive projection deformation compensation based on the elevation of the compensation projection plane and the distance between the meridian where the center of the engineering key region is located and the new central meridian, so as to realize the controlling of engineering projection deformation.

According to a third aspect of an embodiment of the disclosure, there is provided an electronic apparatus including a processor and a memory stored with computer-readable instructions, and the processor is configured to implement, when the computer-readable instructions executed by the processor, the method for controlling engineering projection deformation in the first aspect.

According to a fourth aspect of an embodiment of the disclosure, a non-transitory computer-readable storage medium is provided, on which a computer program is stored, and the computer program is configured to be executed by a processor to implement the method for controlling engineering projection deformation in the first aspect.

The technical solutions provided by the embodiments of the disclosure can include the following beneficial effects.

On the one hand, the disclosure creatively studies the distribution characteristics of height normalization length deformation and Gaussian projection length deformation, skillfully combines height normalization with classical Gaussian projection model, realizes the intelligent pairing and the trend compensation of the spatial distribution of the projection deformation caused by the terrain elevation difference and the Gaussian projection deformation. It can reduce the systematic error of projection deformation in the engineering measurement with large height difference and long distance, and effectively reduce or even eliminate the complicated steps and error accumulation brought by the traditional subarea reduction, thereby realizing the non-subarea processing of the measurement results or greatly reducing the subarea processing, and greatly improving the operation efficiency and the data accuracy. On the other hand, the method fully utilizes the length deformation function per kilometer to carry out engineering projection deformation control, and can further improve the precision of the engineer projection deformation control, thereby greatly improving the accuracy rate of engineering measurement operation based on the disclosure.

Therefore, the disclosure can not only solve the technical problem that it is difficult to build a unified reduction benchmark that can meet the requirements of high standard engineering precision and consistency in large and super-large elevation difference engineering projects, but also contribute a set of more scientific and efficient calculation strategies to the field of precision engineering measurement, especially suitable for those scenes where the terrain or buildings are distributed continuously and complex, and the traditional single projection zoning method cannot meet the strict requirements of engineering projection deformation control, as well as the precision engineering measurement project which has a very high requirement for the accuracy of the projection deformation of the side length.

It should be understood that both the foregoing general description and the following detailed description are exemplary and explanatory only and do not limit the disclosure.

BRIEF DESCRIPTION OF DRAWINGS

The accompanying drawings, which are incorporated in and constitute a part of the specification, illustrate embodiments consistent with the disclosure and together with the description, and are used together with the specification to explain the principle of the disclosure.

FIG. 1 illustrates a flowchart of a method for controlling engineering projection deformation according to some embodiments of the disclosure.

FIG. 2 illustrates a schematic diagram of length deformation per kilometer caused by a height difference according to some embodiments of the disclosure.

DETAILED DESCRIPTION OF EMBODIMENTS

Figure 3:
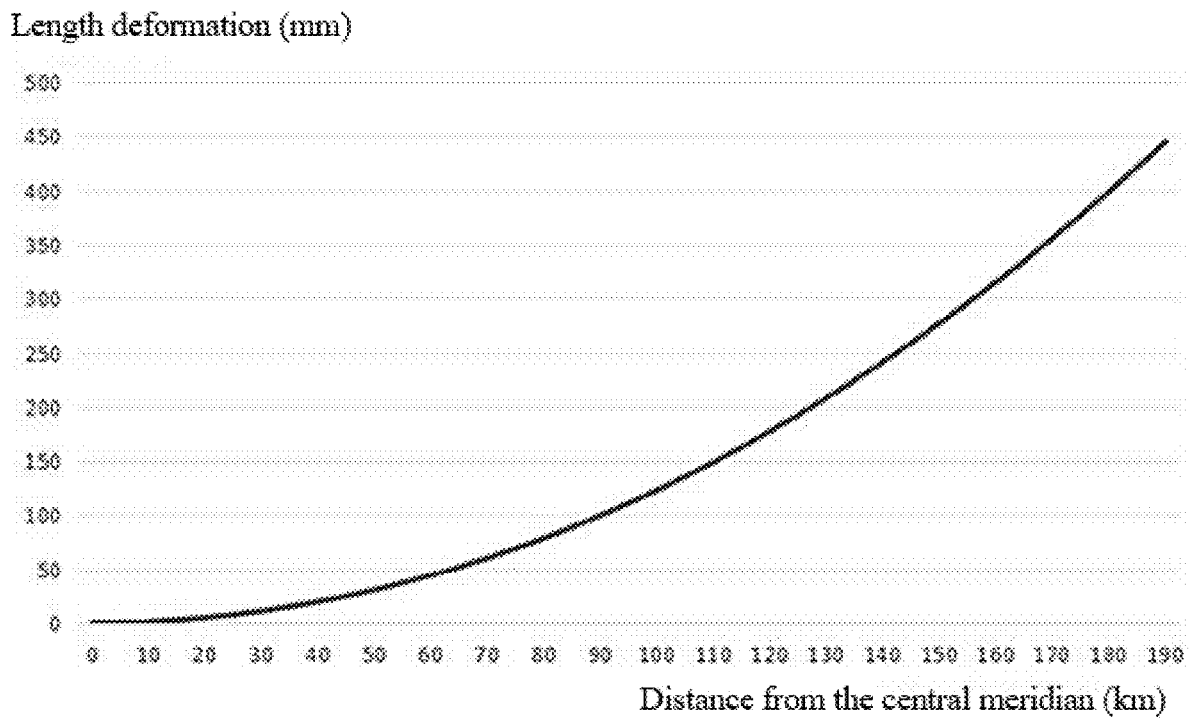
FIG. 3 illustrates a schematic diagram of length deformation per kilometer caused by a distance of a measurement edge from a central meridian according to some embodiments of the disclosure.

Reference will now be made in detail to exemplary embodiments, examples of which are illustrated in the accompanying drawings. When the following description refers to the drawings, unless otherwise indicated, the same numbers in different drawings indicate the same or similar elements. The embodiments described in the following exemplary embodiments do not represent all embodiments consistent with the disclosure. Rather, they are merely examples of devices and methods consistent with some aspects of the disclosure as detailed in the appended claims.

The terminology used herein is for the purpose of describing specific embodiments only and is not intended to limit the disclosure. As used herein and in the appended claims, the singular forms "a", "said" and "the" are also intended to include the plural forms, unless the context clearly indicates other meaning. It should also be understood that the term "and/or" as used herein refers to and includes any or all possible combinations of one or more associated listed items.

It should be understood that, although the terms first, second, third, etc. may be used to describe various information in the disclosure, this information should not be limited to these terms. These terms are only used to distinguish the same type of information from each other. For example, the first information may also be referred to as the second information, and similarly, the second information may also be referred to as the first information, without departing from the scope of the disclosure. Depending on the context, the word "if" as used herein can be interpreted as "at", "when", or "in response to a determination".

The method for controlling engineering projection deformation of the embodiment of the disclosure can be configured as software modules. In some implementation scenarios, the engineering projection deformation control scheme of the disclosure can be deployed separately to realize engineering projection deformation control. In other implementation scenarios, the engineering projection deformation control scheme of the disclosure can be deployed in other software as a function module of the software, such as in an analysis software of engineering projection deformation control, and the application mode of the method for controlling engineering projection deformation of the disclosure is not particularly limited.

Next, the embodiments of the disclosure will be described in detail.

FIG. 1 is a flowchart of a method for controlling engineering projection deformation according to an exemplary embodiment of the disclosure, including:

S101: calculating, based on known coordinates of an engineering key region, a change rate of a length deformation function per kilometer in a first direction caused by a height difference of the engineering key region and a change rate of the length deformation function per kilometer in the first direction caused by a distance from a central meridian of a Gaussian projection zone of the engineering key region;

S102: solving a distance between a meridian where a center of the engineering key region is located and a new central meridian based on the change rate of the length deformation function per kilometer in the first direction caused by the height difference and the change rate of the length deformation function per kilometer in the first direction caused by the distance from the central meridian of the Gaussian projection zone of the engineering key region;

S103: solving an elevation of a compensation projection plane based on the distance between the meridian where the engineering key region is located and the new central meridian; and S014: performing comprehensive projection deformation compensation based on the elevation of the compensation projection plane and the distance between the meridian where the center of the engineering key region is located and the new central meridian, so as to realize the controlling of engineering projection deformation.

It should be noted that the first direction can be any direction. For example, in some embodiments, the first direction is the horizontal axis direction, that is, the Y direction in the engineering measurement field. Of course, it may be the vertical axis direction, that is, the X direction in the engineering measurement field, depending on the selected projection mode. In the embodiment provided by the disclosure, the first direction is defined as the horizontal axis direction, namely the Y direction in the engineering measurement field.

In the step S101, the calculating, based on known coordinates of an engineering key region, a change rate of a length deformation function per kilometer in a first direction caused by a height difference of the engineering key region includes:

based on the known coordinates of the engineering key region, calculating an elevation difference between an elevation plane where a side length is located and a reduction projection plane of the side length;

based on the elevation difference between the elevation plane where the side length is located and the reduction projection plane of the side length, calculating a deformation per kilometer of known points of the engineering key region caused by the height difference; and based on the deformation per kilometer of the known points of the engineering key region caused by the height difference, calculating the change rate of the length deformation function per kilometer in the first direction caused by the height difference of the engineering key region.

In the exemplary embodiment of the disclosure, the engineering key region refers to the key region where the measurement project is located (such as the upper and lower reservoirs of the pumped storage power station, etc.). The known coordinates of the engineering key region refer to the precise location of some specific points (such as control points, landmark points, topographic feature points, etc.) in the engineering region in the three-dimensional space, and these coordinates are usually given in the form of latitude and longitude or plane coordinates and elevation.

On this basis, in the exemplary embodiment of the disclosure, the known coordinates of the engineering key region (such as the upper and lower reservoirs of the pumped storage power station, etc.) are $(X_1, Y_1, H_1)$ and $(X_2, Y_2, H_2)$ respectively for specific description, in which $X_1$ is the ordinate of the first key position, and $Y_1$ is the abscissa of the first key position, $H_1$ is the elevation of the first key position, $X_2$ is the ordinate of the second key position, $Y_2$ is the abscissa of the second key position, and $H_2$ is the elevation of the second key position. The first key position and the second key position may not be the highest point or the lowest point of the engineering key region, the elevation of the first key position may be higher than that of the second key position, and the elevation of the first key position may also be lower than that of the second key position, which is not limited thereto.

Side length (also referred to as ranging side length) refers to the horizontal distance between two known points, and its elevation plane refers to the elevation plane where the actual heights of the two endpoints of this side length are located. When the two endpoints of the side length are not on the same elevation plane, the elevation plane where the side length is located needs to be defined according to the average elevation of the two endpoints of the side length or the fluctuation of the specific terrain.

The reduction projection plane of the side length is the theoretical elevation plane determined to reduce the deformation caused by projection when mapping. For example, in some embodiments, when Gaussian projection is carried out, a specific reference ellipsoid or an average elevation plane (such as the elevation plane where the sea level or the normal water level of the reservoir is located) is usually selected as the basic plane for projection.

On this basis, because the general engineering measurement requires that the projection length deformation in the measurement region should not be greater than 2.5 centimeters per kilogram (cm/km), and the relevant specifications of high-speed railway even require that the projection length deformation in the measurement region should not be greater than 1 cm/km, the comprehensive projection length deformation per kilometer is used for subsequent step calculation, that is, the ranging side length S is 1 km. The calculation formula of length deformation per kilometer caused by the height difference in the measurement region is shown in the following formula:

$$\Delta D = -\frac{\Delta H_m}{R_m}.$$

In the formula, $\Delta D$ is the deformation of length caused by the height difference; $\Delta H_m$ is the elevation difference between the elevation plane where the side length is located and the reduction projection plane of the side length; and $R_m$ is an average radius of curvature of the earth.

Because the coordinates of the engineering key region are known, the elevation plane of the side length of the engineering key region can be determined according to the known coordinates of the engineering key region, and the elevation of the reduction projection plane of the side length is usually a fixed value in one projection, so the elevation of the elevation plane of the side length where is located higher than that of the reduction projection plane of the side length (i.e., the elevation difference between the elevation plane where the side length is located and the reduction projection plane of the side length) can be directly determined. Specifically, the elevation plane of the side length where is located higher than that of the reduction projection plane of the side length can be calculated by using the known point elevation in the engineering key region to subtract the elevation of the reduction projection plane of the side length. Of course, if the elevations of the two endpoints of the side length are different, the more accurate method is to consider the actual changes of the terrain between the two endpoints, the average elevation of the side length is obtained through interpolation or terrain model, and then compared with the elevation of the projection plane.

Here, the measurement region refers to the geographical and spatial range that needs detailed measurement and data collection according to the specific task requirements when engineering measurement is carried out. In general, the delineation of the measurement region needs to cover the engineering key region, that is, the layout of the measurement region, the selection of measurement methods, and the requirements of measurement frequency and accuracy will be formulated around the needs of the engineering key region to ensure the complete measurement of the engineering key region.

It can be seen that the length deformation per kilometer caused by the height difference in the measurement region is a function with the height difference as the independent variable, and there is no deformation when the height difference is 0. The length deformation function per kilometer due to the height difference can be expressed as:

$$d = h \cdot \beta + \varepsilon.$$

In the formula, d is the length deformation per kilometer caused by the height difference at a certain point in the measurement region, h is the height difference from the point to the projection plane; $\beta$ is the regression parameter, and $\varepsilon$ is the error.

When the number of points $n_{point}$ is greater than 2, the least square criterion can be used to estimate the regression parameter $\beta$.

Assuming that the least square estimation value $\hat{\beta}$ of the regression parameter is $\beta$, V is the correction number of length deformation per kilometer caused by height difference, then the error equation of V can be obtained as shown in the following formula:

$$V = H\hat{\beta} - D.$$

In the formula, V is the correction number of length deformation per kilometer caused by the height difference, H is the height difference from each point in the measurement region to the projection plane; $\hat{\beta}$ is the least square estimation value of the regression parameter; and D is the length deformation of each point in the measurement region per kilometer caused by the height difference.

According to the least square principle $V^T V = \min$, the normal equation can be obtained as follows:

$$H^T H \hat{\beta} = H^T D.$$

The least square estimation value of the regression parameter can be obtained by deforming the normal equation:

$$\hat{\beta} = (H^T H)^{-1} H^T D.$$

Then the change rate $k_D$ of the length deformation function per kilometer caused by the height difference in the first direction is the least square estimation value $\hat{\beta}$ of the regression parameter, that is:

$$k_D = \hat{\beta} = (H^T H)^{-1} H^T D.$$

For an engineering project with relatively simple distribution, in order to simplify the calculation, two control points can be selected at both ends of the measurement region or the engineering key region for calculation (the method for determining both ends of the measurement region and the engineering key region is not specifically limited in the disclosure, and those skilled in the art can make the determination according to the needs of the project). Then the length deformation per kilometer at both ends of the engineering key region in the first direction due to the height difference is shown as follows:

$$\Delta D_1 = -\frac{H_1 - H_0}{R_m},$$

$$\Delta D_2 = -\frac{H_2 - H_0}{R_m}.$$

In the formula, $\Delta D_1$ and $\Delta D_2$ are the length deformation per kilometer caused by the height difference at both ends of the engineering key region in the first direction.

Given the abscissa data (i.e. elevation data), the value of the ordinate (i.e., length deformation data) can be obtained according to the formula of length deformation per kilometer caused by the height difference provided by the disclosure. The schematic diagram of length deformation per kilometer caused by the height difference is shown in FIG. 2.

Then the variability of deformation function per kilometer length caused by height difference at known points in engineering key region in the first direction is shown as follows:

$$k_D = \frac{\Delta D_2 - \Delta D_1}{\overline{S}} = \frac{H_1 - H_2}{\overline{S} R_m}.$$

In the formula, $k_D$ is the change rate of the length deformation function per kilometer in the first direction caused by the height difference of the engineering key region; $\Delta D_1$ and $\Delta D_2$ are the length deformations per kilometer caused by the height difference at two ends of the engineering key region in the first direction respectively; $\overline{S} = |Y_1 - Y_2|$ is a distance between two endpoints of the engineering key region in the first direction, and $Y_1$ and $Y_2$ are a first end abscissa and a second end abscissa of the engineering key region in the first direction respectively.

In the step S101, the calculating, based on known coordinates of an engineering key region, a change rate of the length deformation function per kilometer in the first direction caused by a distance from a central meridian of a Gaussian projection zone of the engineering key region includes:

- based on the known coordinates of the engineering key region, calculating a length deformation caused by a distance of a measurement edge from the central meridian of the Gaussian projection zone of the engineering key region;
- based on the length deformation caused by the distance of the measurement edge from the central meridian of the Gaussian projection zone, calculating a deformation per kilometer of the known points caused by the distance from the central meridian of the Gaussian projection zone of the engineering key region; and
- based on the deformation per kilometer of the known points caused by the distance from the central meridian of the Gaussian projection zone of the engineering key region, calculating the change rate of the length deformation function per kilometer in the first direction caused by the distance from the central meridian of the Gaussian projection zone of the engineering key region.

In Gaussian projection, the length deformation increases with the distance from the central meridian, which is caused by transforming the curved surface of the earth into a plane. Gaussian projection is an isometric projection (also referred to as equal-angle projection), and there is no angular and length deformation on the central meridian, but the farther away from the central meridian, the more obvious the length deformation is.

When the ranging side length s is 1 km, the formula for calculating the length deformation ΔL per kilometer caused by the distance from the central meridian of the Gaussian projection zone is:

$$\Delta L = \frac{Y_m^2}{2R_m^2}.$$

In the formula, $R_m$ is an average radius of curvature of the earth, and $Y_m$ is the abscissa of two known points in the engineering key region.

Then the length deformations per kilometer of two known points in the engineering key region caused by the distance of the measurement edge from the central meridian of the Gaussian projection zone is shown as follows:

$$\Delta L_1 = \frac{Y_1^2}{2R_m^2},$$

$$\Delta L_2 = \frac{Y_2^2}{2R_m^2}.$$

In the formula, $\Delta L_1$ and $\Delta L_2$ are the length deformations per kilometer of the two known points in the engineering key region caused by the distance of the measurement edge from the central meridian of the Gaussian projection zone respectively; and $Y_1$ and $Y_2$ are the abscissa of the two known points of the engineering key region in the first direction respectively.

Given the abscissa data (data of the distance from the central meridian), based on the formula of length deformation per kilometer caused by the distance of the measurement edge from the central meridian of the Gaussian projection zone, the value of the ordinate (i.e., length deformation data) can be obtained. A schematic diagram of the length deformation per kilometer caused by the distance of the measurement edge from the central meridian is shown in FIG. 3.

Then the change rate of length deformation function per kilometer caused by the distance from the central meridian of the Gaussian projection zone in the engineering key region is calculated as follows:

$$k_L = \frac{\Delta L_2 - \Delta L_1}{\overline{S}} = \frac{Y_1^2 - Y_2^2}{2\overline{S}R_m^2}.$$

In the step S102, the solving a distance between a meridian where a center of the engineering key region is located and a new central meridian based on the change rate of the deformation function per kilometer length in the first direction caused by the height difference and the change rate of the deformation function per kilometer length in the first direction caused by the distance from the central meridian of the Gaussian projection zone of the engineering key region includes:

- controlling the change rate of the length deformation function per kilometer in the first direction caused by the height difference of the engineering key region to be equal to the change rate of the length deformation function per kilometer in the first direction caused by the distance from the central meridian of the Gaussian projection zone of the engineering key region, to obtain a distance function between the meridian where the center of the engineering key region is located and the new central meridian; and
- based on the change rate of the length deformation function per kilometer in the first direction caused by the height difference of the engineering key region, calculating the distance between the meridian where the center of the engineering key region is located and the new central meridian by using the distance function between the meridian where the center of the engineering key region is located and the new central meridian.

In order to offset the length deformation per kilometer caused by the distance from the central meridian of the Gaussian projection zone and the length deformation per kilometer caused by the height difference, a new central meridian can be defined, that is, by finding $k_L$ (the change rate of length deformation function per kilometer in the first direction caused by the distance from the central meridian of the Gaussian projection zone) which is closest to $k_D$ (the change rate of the length deformation function per kilometer in the first direction caused by the height difference), the change rate of length deformation function per kilometer in the first direction caused by the distance of the measurement edge from the central meridian in the engineering key region is equal to the change rate of length deformation function per kilometer in the first direction caused by the height difference, that is, $k_L=k_D$, so the distance function between the meridian where the center of the engineering key region is located and the new central meridian is:

$$Y'_m = R_m^2 k_D.$$

In the formula, $Y'_m$ is the distance between the meridian where the center of the engineering key region is located and the new central meridian.

In the step S103, the comprehensive projection deformation of the ranging side length is:

$$\Delta S = \Delta D + \Delta L = \frac{S}{2R_m^2}(Y_m'^2 - 2R_m H_m).$$

In the formula, $H_m$ is the average elevation of the reduction projection plane of side length above the reference ellipsoid.

Here, the reference ellipsoid is an ellipsoid with precise definition in theory and mathematics, which is used as an approximate model of the earth and is the basis of map projection and geodesy.

Setting $\Delta S=0$ at the point of $Y'_m$ the following formula can be obtained:

$$H'_m = \frac{Y_m'^2}{2R_m}.$$

In the formula, $H'_m$ is the elevation of the reduction projection plane of the side length above the compensation projection plane.

Then the compensation projection plane elevation H is:

$$H = H_m - H'_m.$$

In the step S104, the performing comprehensive projection deformation compensation based on the elevation of the compensation projection plane, so as to realize the controlling of engineering projection deformation includes:
correcting the elevation of the compensation projection plane to obtain a corrected elevation of the compensation projection plane.

In the step S104, the performing comprehensive projection deformation compensation the distance between the meridian where the center of the engineering key region is located and the new central meridian, so as to realize the controlling of engineering projection deformation includes:
determining the theoretical comprehensive projection deformation per kilometer based on the elevation of the compensation projection plane or the corrected elevation of the compensation projection plane; and
when the theoretical comprehensive projection deformation per kilometer meets an accuracy requirement, performing the comprehensive projection deformation compensation using the distance between the meridian where the center of the engineering key region is located and the new central meridian and the elevation of the compensation projection plane (that is, the length deformation per kilometer caused by the height difference and the length deformation caused by the distance of the measurement edge from the central meridian of the Gaussian projection zone), so as to realize the controlling of engineering projection deformation.

In general, comprehensive projection deformation compensation can be carried out according to the distance between the meridian where the center of the engineering key region is located and the new central meridian and the elevation of the compensation projection plane. However, in alpine valleys and heavily vegetated environments, the accuracy of precision ranging side length is generally better than that of global navigation satellite system (GNSS) measurement results. Therefore, the precision ranging side length can be used to test the GNSS measurement results. When there are significant systematic differences, the scale ratio relationship can be established based on the precision ranging scale, and the scale ratio results can be equivalently converted into ellipsoid parameters through the conversion model to optimize the parameters of the compensation projection plane, so as to process the GNSS control measurement results and further suppress the side length projection deformation.

Assuming that the coordinates of two known points A and B are $(X_a, Y_a)$ and $(X_b, Y_b)$ respectively, the precise measured horizontal distance (i.e., precise measured side length) is $S_{ab}$, and the calculated side length (also referred to as inverse side length) of GNSS control point results is $S_{Gab}$, then the ratio of the precise measured side length to the calculated side length of GNSS control point results is as follows:

$$C = \frac{S_{ab}}{S_{Gab}}.$$

In the formula, C is a side length reduction scale ratio of the global navigation satellite system relative to a measured ground control network.

Then the projection deformation $\Delta S$ of the side length is:

$$\Delta S = S_{Gab} - S_{ab} = \frac{S_{ab}}{C} - S_{ab} = \frac{S_{ab} - C \times S_{ab}}{C}.$$

In order to compensate for the scale ratio residual error, combined with the calculation formula $$\Delta D = -\frac{S}{R_m}\Delta H_m$$

of length deformation caused by the height difference, the correction value $\hat{H}_m$ of projection plane compensated by the scale ratio residual error can be obtained:

$$\hat{H}_m = -\frac{R_m}{S_{ab}}\Delta S = -\frac{R_m}{S_{ab}}\frac{S_{ab} - CS_{ab}}{C} = -R_m\frac{1-C}{C}.$$

Further, the compensation projection plane elevation H' (i.e., corrected elevation of the compensation projection plane) after the correction of the scale ratio residual error can be obtained:

$$H' = H_m - \hat{H}_m.$$

In the formula, H' the elevation of the compensation projection plane after the scale ratio residual error is corrected; H is the elevation of the original compensation projection plane; $\hat{H}'_m$ is the scale ratio residual error correction value of the compensation projection plane.

On this basis, the theoretical comprehensive projection deformation per kilometer $S_{kmi}$ is:

$$S_{kmi} = \frac{Y_m'^2}{2R_m^2} - \frac{H_i - H_{final}}{R_m}.$$

In the formula, $S_{kmi}$ is the theoretical comprehensive projection deformation per kilometer calculated by the model at the point i; $Y'_m$ is the distance between the meridian where the center of the engineering key region is located and the new central meridian; $R_m$ is the average radius of curvature of the earth; $H_i$ is the elevation at the point i; $H_{final}$ is the final compensation projection plane elevation (including the compensation projection plane elevation H and the corrected elevation of the compensation projection plane H').

In order to reduce the constraint conditions of adjustment calculation, the calculated theoretical comprehensive projection deformation per kilometer can also be converted to the long radius of ellipsoid, and the more accurate compensation calculation of projection deformation of measurement results can be realized by modifying ellipsoid parameters.

Figure 4:
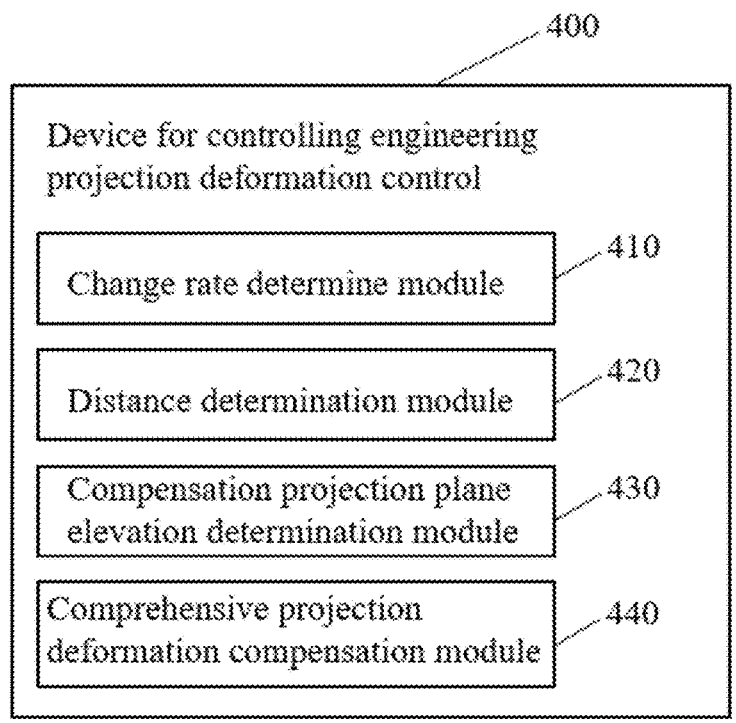
FIG. 4 illustrates a schematic diagram of a device for controlling engineering projection deformation according to some embodiments of the disclosure.

According to the second aspect of the embodiment of the disclosure, there is also provided a device for controlling engineering projection deformation 400, which, as shown in FIG. 4, including: a change rate determine module 410, a distance determination module 420, a compensation projection plane elevation determination module 430, and a comprehensive projection deformation compensation module 440. In an embodiment, each of the change rate determine module 410, the distance determination module 420, the compensation projection plane elevation determination module 430, and the comprehensive projection deformation compensation module 440 is embodied by software stored in at least one memory and executable by at least one processor.

The change rate determination module 410 is used to calculate, based on known coordinates of an engineering key region, a change rate of a length deformation function per kilometer in a first direction caused by a height difference of the engineering key region and a change rate of the length deformation function per kilometer in the first direction caused by a distance from a central meridian of a Gaussian projection zone of the engineering key region.

The distance determination module 420 is used to solve a distance between a meridian where a center of the engineering key region is located and a new central meridian based on the change rate of the length deformation function per kilometer in the first direction caused by the height difference and the change rate of the length deformation function per kilometer in the first direction caused by the distance from the central meridian of the Gaussian projection zone of the engineering key region.

The compensation projection plane elevation determination module 430 is used to solve an elevation of a compensation projection plane based on the distance between the meridian where the engineering key region is located and the new central meridian.

The comprehensive projection deformation compensation module 440 is used to perform comprehensive projection deformation compensation based on the elevation of the compensation projection plane and the distance between the meridian where the center of the engineering key region is located and the new central meridian, so as to realize the controlling of engineering projection deformation.

In an exemplary embodiment of the disclosure, based on the aforementioned scheme, the change rate determination module 410 may further include: an elevation calculation submodule, a deformation calculation submodule, and a change rate calculation submodule.

The elevation calculation submodule is used to, based on the known coordinates of the engineering key region, calculate an elevation difference between an elevation plane where a side length is located and a reduction projection plane of the side length.

The deformation calculation submodule is used to, based on the elevation difference between the elevation plane where the side length is located and the reduction projection plane of the side length, calculate a length deformation per kilometer of known points of the engineering key region caused by the height difference; and based on the known coordinates of the engineering key region, calculate a length deformation caused by a distance from the central meridian of the Gaussian projection zone of the engineering key region.

The change rate calculation submodule is used to, based on the length deformation per kilometer of the known points of the engineering key region caused by the height difference and the length deformation caused by the distance from the central meridian of the Gaussian projection zone of the engineering key region, calculate the change rate of the length deformation function per kilometer in the first direction caused by the height difference of the engineering key region and the change rate of the length deformation function per kilometer in the first direction caused by the distance from the central meridian of the Gaussian projection zone of the engineering key region.

In an exemplary embodiment of the disclosure, based on the aforementioned scheme, the distance determination module 420 may further include: a distance function generation submodule and a distance calculation submodule.

The distance function generation submodule is used to control the change rate of the length deformation function per kilometer in the first direction caused by the height difference of the engineering key region to be equal to the change rate of the length deformation function per kilometer in the first direction caused by the distance from the central meridian of the Gaussian projection zone of the engineering key region, to obtain a distance function between the meridian where the center of the engineering key region is located and the new central meridian.

The distance calculation submodule is used to, based on the change rate of the length deformation function per kilometer in the first direction caused by the height difference of the engineering key region, calculate the distance between the meridian where the center of the engineering key region is located and the new central meridian by using the distance function between the meridian where the center of the engineering key region is located and the new central meridian.

In an exemplary embodiment of the disclosure, based on the aforementioned scheme, the comprehensive projection deformation compensation module 440 may further include: a compensation projection plane elevation correction submodule, a comprehensive projection deformation determination submodule, and a deformation compensation submodule.

The compensation projection plane elevation correction submodule is used to correct the elevation of the compensation projection plane to obtain a corrected elevation of the compensation projection plane.

The comprehensive projection deformation determination submodule is used to determine the theoretical comprehensive projection deformation per kilometer based on the elevation of the compensation projection plane or the corrected compensation projection plane elevation.

The deformation compensation submodule is used to perform the comprehensive projection deformation compensation using the distance between the meridian where the center of the engineering key region is located and the new central meridian and the elevation of the compensation projection plane or the corrected compensation projection plane elevation, so as to realize the controlling of engineering projection deformation.

It should be noted that although several modules and submodules of the device for controlling engineering projection deformation are mentioned in the above detailed description, this division is not mandatory. In fact, according to the embodiment of the disclosure, the features and functions of two or more modules or sub-modules described above can be embodied in one module or unit. On the contrary, the features and functions of one module or submodule described above can be further divided into multiple modules or submodules.

In addition, in an exemplary embodiment of the disclosure, the disclosure also provides an electronic apparatus capable of realizing the above-mentioned method for controlling engineering projection deformation.

Those skilled in the art can understand that various aspects of the disclosure can be implemented as systems, methods or program products. Therefore, various aspects of the disclosure can be embodied in the following forms: an entirely hardware embodiment, an entirely software embodiment (including firmware, microcode, etc.), or an embodiment combining hardware and software, which can be collectively referred to as a "circuit", "module" or "system" herein.

An electronic apparatus 500 according to this embodiment of the disclosure will be described below with reference to FIG. 5. The electronic apparatus 500 shown in FIG. 5 is just an example, which should not bring any limitation to the function and application scope of the embodiment of the disclosure.

Figure 5:
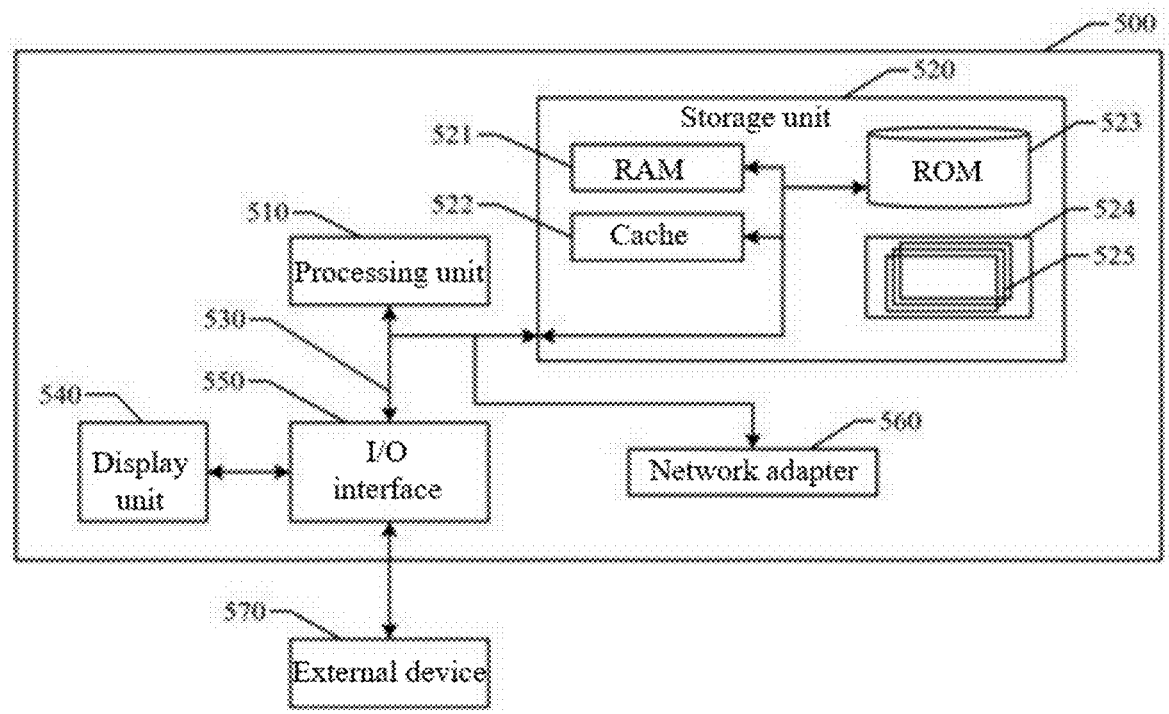
FIG. 5 illustrates a schematic structural diagram of a computer system of an electronic apparatus according to some embodiments of the disclosure.

Referring to FIG. 5, the electronic apparatus 500 is represented in the form of a general-purpose computing device. Components of the electronic apparatus 400 may include, but are not limited to, the above-mentioned at least one processing unit 510, the above-mentioned at least one storage unit 520, a bus 530 connecting different system components (including the storage unit 520 and the processing unit 510), and a display unit 540.

Specifically, the storage unit 520 stores a program code that can be executed by the processing unit 510, so that the processing unit 510 performs the steps according to various exemplary embodiments of the disclosure described in the "exemplary method" section of the disclosure. For example, the processing unit 510 can perform the steps as shown in FIG. 1: S101, calculating, based on known coordinates of an engineering key region, a change rate of a length deformation function per kilometer in a first direction caused by a height difference of the engineering key region and a change rate of the length deformation function per kilometer in the first direction caused by a distance from a central meridian of a Gaussian projection zone of the engineering key region; S102, solving a distance between a meridian where a center of the engineering key region is located and a new central meridian based on the change rate of the length deformation function per kilometer in the first direction caused by the height difference and the change rate of the length deformation function per kilometer in the first direction caused by the distance from the central meridian of the Gaussian projection zone of the engineering key region; S103, solving an elevation of a compensation projection plane based on the distance between the meridian where the engineering key region is located and the new central meridian; and S104: performing comprehensive projection deformation compensation based on the elevation of the compensation projection plane and the distance between the meridian where the center of the engineering key region is located and the new central meridian, so as to realize the controlling of engineering projection deformation.

The storage unit 520 may include a readable medium in the form of a volatile memory, such as a random-access memory (RAM) 521 and/or a high-speed cache memory 522, and may further include a read-only memory (ROM) 523.

The storage unit 520 may further include a program/a utility tool 524 having a set of (at least one) program modules 525, such that program modules 525 include, but not limited to, an operating system, one or more application programs, other program modules, and program data.

The bus 530 may represent one or more of several types of bus structures, including a storage unit bus or a storage unit controller, a peripheral bus, a graphics acceleration port, a processing unit, or a local bus using any of a variety of bus structures.

The electronic apparatus 500 can also communicate with one or more external devices 570 (e.g., keyboard, pointing device, etc.), and can also communicate with one or more devices that enable users to interact with the electronic apparatus 500, and/or communicate with any device that enables the electronic apparatus 500 to communicate with one or more other computing devices (e.g., routers, modems, etc.). This communication may be through an input/output (I/O) interface 550. Moreover, the electronic apparatus 500 can also communicate with one or more networks (such as physically isolated local area network abbreviated as LAN, wide area network abbreviated as WAN, and/or public network) through the network adapter 560. As shown in FIG. 5, the network adapter 560 communicates with other modules of the electronic apparatus 500 through the bus 530. It should be understood that although not shown in the drawings, other hardware and/or software modules can be used in conjunction with the electronic apparatus 500, including but not limited to: microcode, device drivers, redundant processing units, external disk drive arrays, redundant array of independent disk (RAID) systems, tape drives, and data backup storage systems.

Through the description of the above embodiments, it is readily understood by those skilled in the art that the example embodiments described herein can be realized by means of software, or by means of software in combination with the necessary hardware. Accordingly, the technical solution according to embodiments of the disclosure may be embodied in the form of a software product that may be stored in a non-transitory storage medium (which may be a compact disc read-only memory abbreviated as CD-ROM, a universal serial bus abbreviated as USB flash drive, a removable hard disk, etc.) or on a network, including a number of instructions for causing a computing device (which may be a personal computer, a server, a terminal device, etc.) to implement the method according to the embodiment of the disclosure.

In an exemplary embodiment of the disclosure, a computer-readable storage medium is also provided, on which a program product capable of realizing the above method of the disclosure is stored. In some possible embodiments, various aspects of the disclosure can also be embodied in the form of a program product, which includes program code, and when the program product is run on a terminal device, the program code is used for causing the terminal device to implement the steps according to various exemplary embodiments of the disclosure described in the above-mentioned "exemplary method" section of the disclosure.

Figure 6:
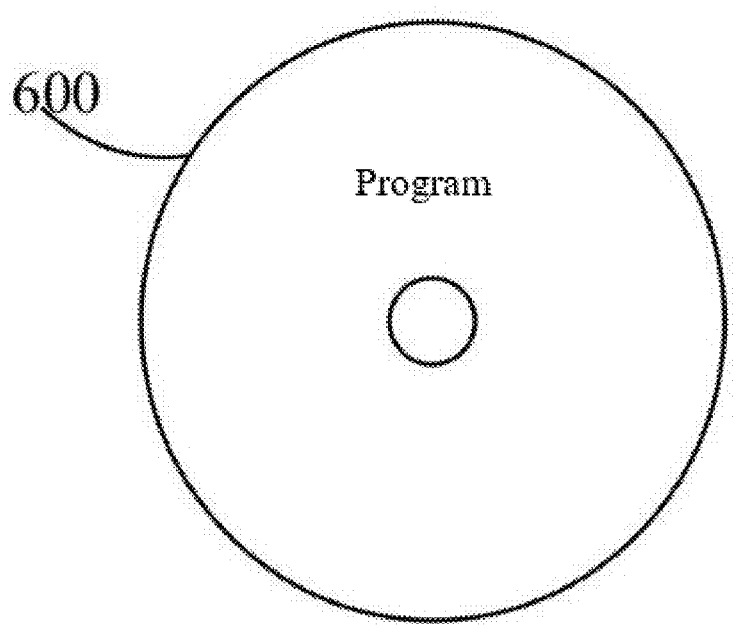
FIG. 6 illustrates a schematic diagram of a computer-readable storage medium according to some embodiments of the disclosure.

Referring to FIG. 6, a program product 600 for implementing the above-mentioned method for controlling engineering projection deformation according to an embodiment of the disclosure is described, which can adopt a portable CD-ROM and include program codes, and can be run on a terminal device, such as a personal computer. However, the program product of the disclosure is not limited to this. In the disclosure, the readable storage medium can be any tangible medium containing or storing a program, which can be used by or in combination with an instruction execution system, device, or element.

The program product can adopt any combination of one or more readable storage media. The readable storage medium can be, for example, but not limited to, an electrical, magnetic, optical, electromagnetic, infrared, or semiconductor system, device or element, or any combination of the above. More specific examples (a non-exhaustive list) of readable storage media include: an electrical connection with one or more wires, a portable disk, a hard disk, a RAM, a ROM, an erasable programmable read-only memory (EPROM or flash memory), an optical fiber, a portable CD-ROM, an optical storage device, a magnetic storage device, or any suitable combination of the above.

The program code for performing the operations of the disclosure can be written in any combination of one or more programming languages, including but not limited to Java, C++, C language or Python. The program code may be completely executed on the user computing device, partially executed on the user device, executed as an independent software package, partially executed on the user computing device and partially executed on the remote computing device, or completely executed on the remote computing device or server. In the case of involving the remote computing device, the remote computing device can be connected to the user computing device through any kind of network, including LAN or WAN, or can be connected to an external computing device (for example, through the Internet using an Internet service provider).

In addition, the above drawings are only schematic illustrations of the processes involved in the method according to the exemplary embodiment of the disclosure, and are not intended to be limiting. It will be readily understood that the processes shown in the drawings do not indicate or limit the temporal sequence of these processes. It is also readily understood that the processes may be performed, for example, synchronously or asynchronously in multiple modules.

Through the description of the above embodiments, it is easy for those skilled in the art to understand that the example embodiments described here can be realized by software or by combining software with necessary hardware. Therefore, the technical solution according to the embodiment of the disclosure can be embodied in the form of a software product, which can be stored in a non-transitory storage medium (which can be a CD-ROM, a USB flash drive, a mobile hard disk, etc.) or on the network, and includes several instructions to make a computing device (which can be a personal computer, a server, a touch terminal, or a network device, etc.) execute the method according to the embodiment of the disclosure.

Other embodiments of the disclosure will easily occur to those skilled in the art after considering the specification and practicing the disclosure disclosed herein. The disclosure is intended to cover any variation, use or adaptation of the disclosure, which follows the general principles of the disclosure and includes common knowledge or common technical means in the technical field that are not disclosed in the disclosure. The specification and embodiments are to be regarded as exemplary only, with the true scope and spirit of the disclosure being indicated by the claims.

It should be understood that the disclosure is not limited to the precise structure that has been described above and shown in the drawings, and various modifications and changes can be made without departing from its scope. The scope of the disclosure is limited only by the appended claims.

What is claimed is:

1. A method for controlling engineering projection deformation, comprising:
   calculating, based on known coordinates of an engineering key region, a change rate of a length deformation function per kilometer in a first direction caused by a height difference of the engineering key region and a change rate of the length deformation function per kilometer in the first direction caused by a distance from a central meridian of a Gaussian projection zone of the engineering key region;
   solving a distance between a meridian where a center of the engineering key region is located and a new central meridian based on the change rate of the length deformation function per kilometer in the first direction caused by the height difference and the change rate of the length deformation function per kilometer in the first direction caused by the distance from the central meridian of the Gaussian projection zone of the engineering key region;
   solving an elevation of a compensation projection plane based on the distance between the meridian where the engineering key region is located and the new central meridian; and
   performing comprehensive projection deformation compensation based on the elevation of the compensation projection plane and the distance between the meridian where the center of the engineering key region is located and the new central meridian, so as to realize the controlling of engineering projection deformation;
   wherein the calculating, based on known coordinates of an engineering key region, a change rate of a length deformation function per kilometer in a first direction caused by a height difference of the engineering key region comprises:
     based on the known coordinates of the engineering key region, calculating an elevation difference between an elevation plane where a side length is located and a reduction projection plane of the side length;
     based on the elevation difference between the elevation plane where the side length is located and the reduction projection plane of the side length, calculating a deformation per kilometer of known points of the engineering key region caused by the height difference; and
     based on the deformation per kilometer of the known points of the engineering key region caused by the height difference, calculating the change rate of the length deformation function per kilometer in the first direction caused by the height difference of the engineering key region;
   wherein the based on the elevation difference between the elevation plane where the side length is located and the reduction projection plane of the side length, calculating a length deformation per kilometer of known points of the engineering key region caused by the height difference comprises:

$$\Delta D = -\frac{\Delta H_m}{R_m},$$

where $\Delta D$ is the length deformation caused by the height difference; $\Delta H_m$ is the elevation difference between the elevation plane where the side length is located and the reduction projection plane of the side length; and $R_m$ is an average radius of curvature of the earth.

2. The method as claimed in claim 1, wherein the based on the deformation per kilometer of the known points of the engineering key region caused by the height difference, calculating the change rate of the length deformation function per kilometer in the first direction caused by the height difference of the engineering key region comprises:

$$k_D = \frac{\Delta D_2 - \Delta D_1}{S},$$

where $k_D$ is the change rate of the length deformation function per kilometer in the first direction caused by the height difference of the engineering key region; $\Delta D_1$ and $\Delta D_2$ are the length deformations per kilometer caused by the height difference at two ends of the engineering key region in the first direction respectively; $S=|Y_1-Y_2|$ is a distance between two endpoints of the engineering key region in the first direction, and $Y_1$ and $Y_2$ are a first end abscissa and a second end abscissa of the engineering key region in the first direction respectively.

3. The method as claimed in claim 1, wherein the calculating, based on known coordinates of an engineering key region, a change rate of the length deformation function per kilometer in the first direction caused by a distance from a central meridian of a Gaussian projection zone of the engineering key region comprises:
based on the known coordinates of the engineering key region, calculating a length deformation caused by a distance of a measurement edge from the central meridian of the Gaussian projection zone of the engineering key region;
based on the length deformation caused by the distance of the measurement edge from the central meridian of the Gaussian projection zone, calculating a deformation per kilometer of the known points caused by the distance from the central meridian of the Gaussian projection zone of the engineering key region; and
based on the deformation per kilometer of the known points caused by the distance from the central meridian of the Gaussian projection zone of the engineering key region, calculating the change rate of the length deformation function per kilometer in the first direction caused by the distance from the central meridian of the Gaussian projection zone of the engineering key region.

4. The method as claimed in claim 1, wherein the solving a distance between a meridian where a center of the engineering key region is located and a new central meridian based on the change rate of the length deformation function per kilometer in the first direction caused by the height difference and the change rate of the deformation function per kilometer length in the first direction caused by the distance from the central meridian of the Gaussian projection zone of the engineering key region comprises:
controlling the change rate of the length deformation function per kilometer in the first direction caused by the height difference of the engineering key region to be equal to the change rate of the length deformation function per kilometer in the first direction caused by the distance from the central meridian of the Gaussian projection zone of the engineering key region, to obtain a distance function between the meridian where the center of the engineering key region is located and the new central meridian; and
based on the change rate of the length deformation function per kilometer in the first direction caused by the height difference of the engineering key region, calculating the distance between the meridian where the center of the engineering key region is located and the new central meridian by using the distance function between the meridian where the center of the engineering key region is located and the new central meridian.

5. The method as claimed in claim 4, wherein the distance function between the meridian where the center of the engineering key region is located and the new central meridian is:

$$Y'_m = R_m^2 k_D,$$

where $Y'_m$ is the distance between the meridian where the center of the engineering key region is located and the new central meridian, and $k_D$ is the change rate of the length deformation function per kilometer in the first direction caused by the height difference of the engineering key region.

6. The method as claimed in claim 1, wherein the performing comprehensive projection deformation compensation based on the elevation of the compensation projection plane and the distance between the meridian where the center of the engineering key region is located and the new central meridian, so as to realize the controlling of engineering projection deformation comprises:
correcting the elevation of the compensation projection plane to obtain a corrected elevation of the compensation projection plane; and
determining a theoretical comprehensive projection deformation per kilometer based on the elevation of the compensation projection plane or the corrected elevation of the compensation projection plane; when the theoretical comprehensive projection deformation per kilometer meets an accuracy requirement, performing the comprehensive projection deformation compensation using the distance between the meridian where the center of the engineering key region is located and the new central meridian and the elevation of the compensation projection plane, so as to realize the controlling of engineering projection deformation.

7. The method as claimed in claim 6, wherein the correcting the elevation of the compensation projection plane to obtain a corrected elevation of the compensation projection plane comprises:
based on the known coordinates of the engineering key region, precise measured horizontal distances and a calculated side length from control points of a global navigation satellite system, calculating a side length reduction scale ratio of the global navigation satellite system relative to a measured ground control network;

calculating a residual error of the side length reduction scale ratio by using the side length reduction scale ratio;

calculating a scale ratio residual error correction value of the compensation projection plane by using the residual error of the side length reduction scale ratio and a length deformation calculation formula caused by the height difference; and acquiring the corrected elevation of the compensation projection plane based on the scale ratio residual error correction value of the compensation projection plane and the elevation of the compensation projection plane.

\* \* \* \* \*